Dec. 21, 1948.  L. B. SWAFFORD  2,456,901
COTTON CHOPPER WITH BURNERS
Filed Oct. 11, 1946  4 Sheets-Sheet 1

INVENTOR.
Luther B. Swafford
BY
Attorneys

Dec. 21, 1948.    L. B. SWAFFORD    2,456,901
COTTON CHOPPER WITH BURNERS
Filed Oct. 11, 1946    4 Sheets-Sheet 2

Inventor
Luther B. Swafford

By McMorrow, Berman & Davidson
Attorneys

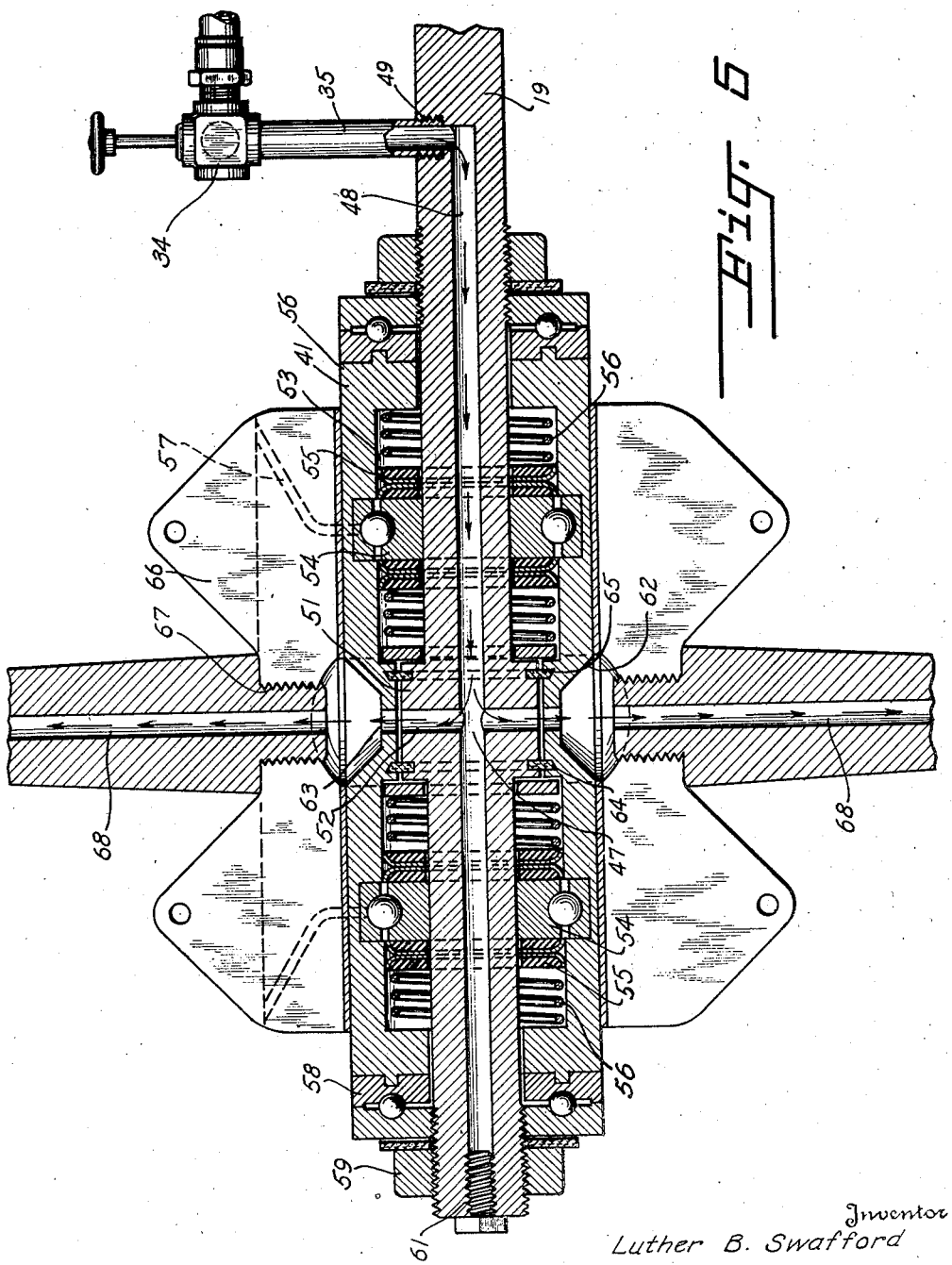

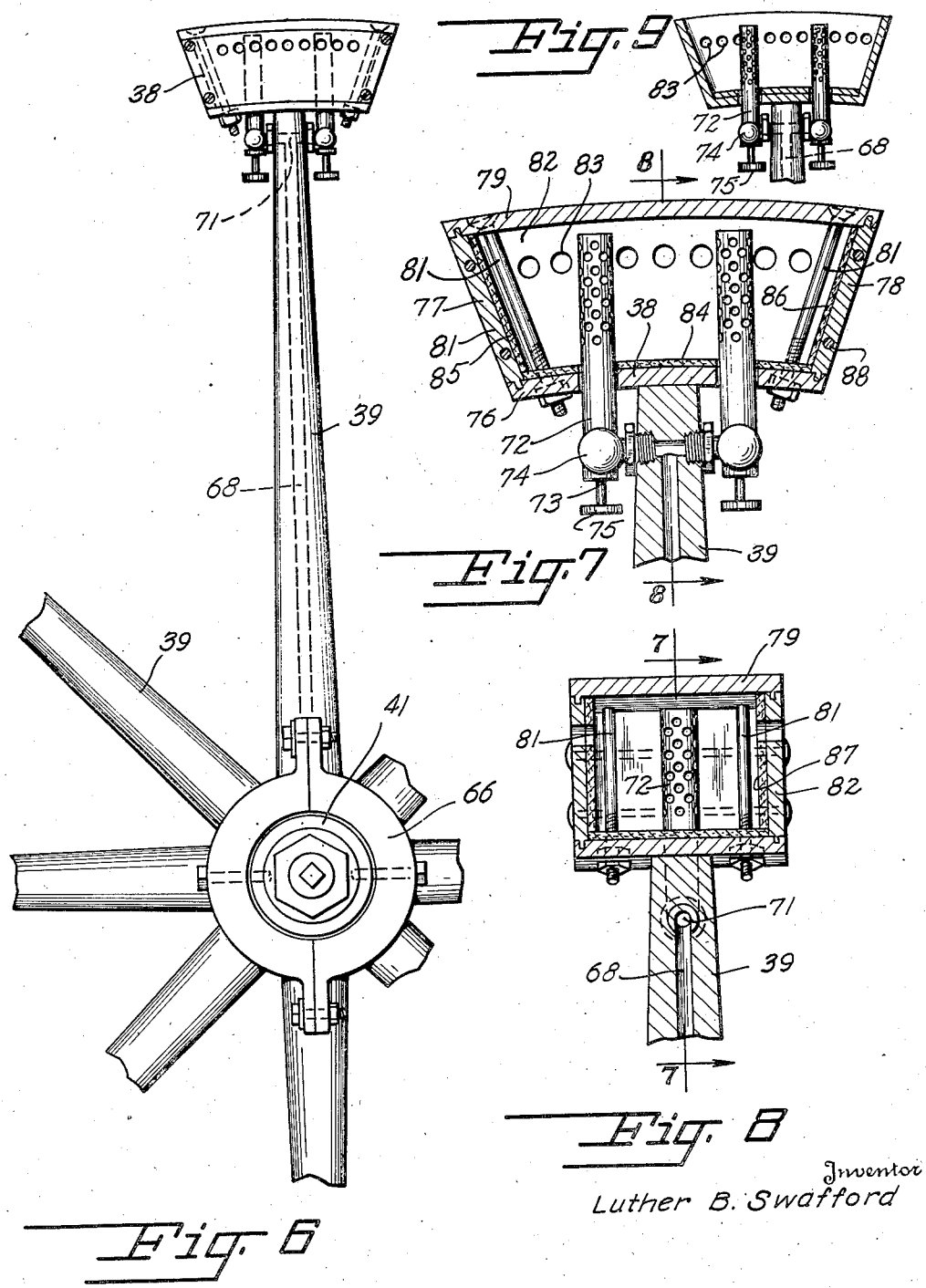

Patented Dec. 21, 1948

2,456,901

UNITED STATES PATENT OFFICE 2,456,901

COTTON CHOPPER WITH BURNERS

Luther B. Swafford, England, Ark.

Application October 11, 1946, Serial No. 702,792

7 Claims. (Cl. 97—22)

This invention relates to agricultural implements, and more particularly, to an implement which will chop cotton or other row crops by the application of heat.

It is an object of the present invention to provide an apparatus for chopping cotton and the like which is of simple construction, easy to manufacture, and efficient in operation.

It is another object of the present invention to provide in an agricultural implement employing flame-throwing apparatus for the removal of cotton stubble or other crops wherein the flame will be directed and retained within a small area of the ground surface so that a maximum effect will be had upon the crop being destroyed or chopped.

It is another object of the invention to provide in an agricultural implement employing flames for eradicating crop material an arrangement wherein the fuel mixture can be conducted to the ground surface through the wheel axles and radially from the wheel axles through spokes of the supporting wheels of the implement.

It is another object of the present invention to provide an agricultural implement having burners for heat-treating the surface of the soil bearing the crop to be eradicated and in which the fuel mixture is delivered through the axles and spokes of the wheels, means wherein the axles and the wheels can be adjusted for different widths of rows being traversed by the wheel-containing burners.

According to the present invention, there is provided an implement having laterally adjustable wheels in which the wheels are the burners by which the crops are eradicated. These wheels have box-like structures upon the respective spokes of the same and within these box-like structures are burners adapted to heat, according to one form of the invention, the flat supporting surface, or according to the other form of the invention, to extend the flame through the open bottoms of the box-like structures. The fuel mixture is delivered to these box-like structures by way of the axles and the individual spokes comprising parts of the wheels. The axle structures are connected to the frame of the implement for lateral adjustment so as to adapt the implement for rows of crops of different widths. The tops of the wheels are covered by hoods, and extending into these hoods are pilot flames which serve to ignite any of the burners which may have been extinguished during the operation. On the top of the frame are two pressure tanks, one containing fuel gas and the other containing compressed air or oxygen. The box-like structures may be lined with asbestos throughout the interior of the same, as along the sides and in the tops, whereby to prevent the loss of heat through the box-like structures except in the direction of the bottoms where the heat is intended to be extended.

For other objects, and for a better understanding of the invention, reference may be had to the following detailed description taken in connection with the accompanying drawings, in which:

Figure 5 is an enlarged longitudinal cross-sectional view taken through one of the wheels at the hub portion thereof and showing how the fuel mixture is distributed to the various spokes forming a part of the wheel.

Figure 6 is a fragmentary plan view looking upon the hub of a wheel and with one of its spokes and its box structure being shown.

Figure 7 is a cross-sectional view taken longitudinally of one of the heating box structures, and as viewed along the line 7—7 of Figure 8 and looking in the direction of the arrows thereof.

Figure 8 is a transverse cross-sectional view of the heating box structure taken along the line 8—8 of Figure 7 and looking in the direction of the arrows thereof.

Figure 9 is a longitudinal cross-sectional view of a modified form of heating box structure wherein the bottom of the structure is open so that the ground and the crop being eradicated receive the direct force of the flames.

Figures 1, 2:
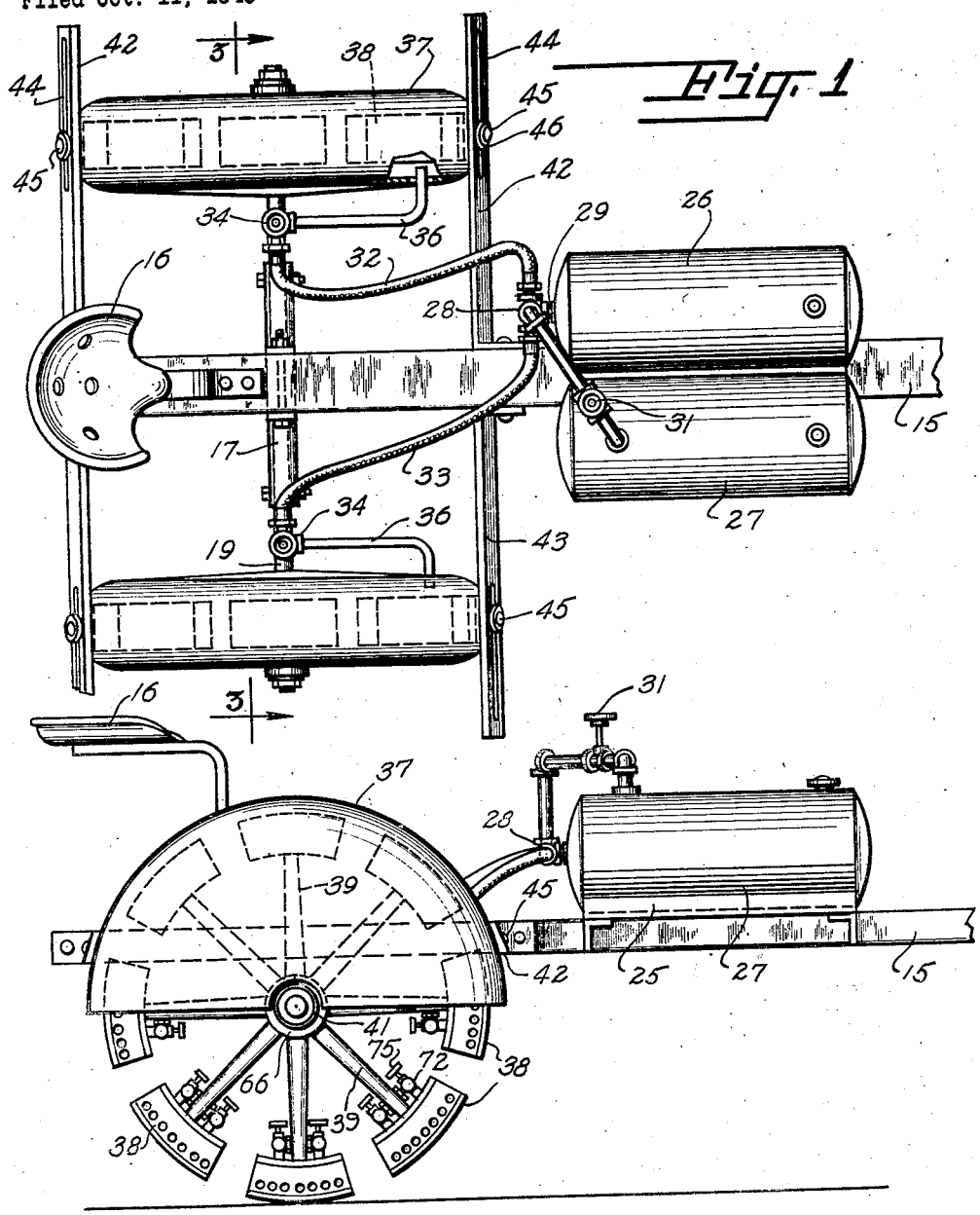
Figure 1 is a top plan view of the implement embodying the features of the present invention.
Figure 2 is a side elevational view of the implement as shown in Figure 1.
Figure 3:
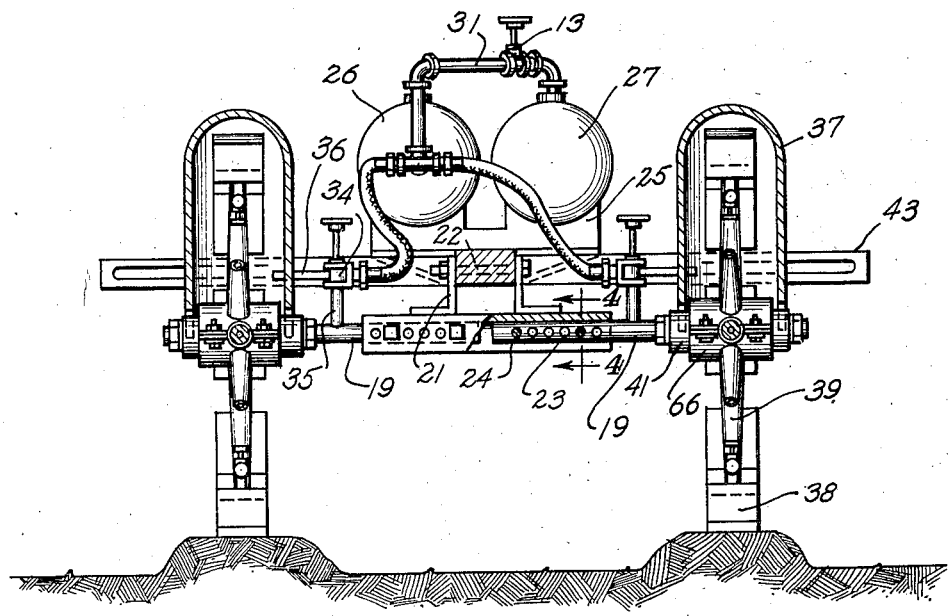
Figure 3 is a transverse cross-sectional view taken through the implement as viewed along the line 3—3 of Figure 1 and looking in the direction of the arrows thereof.
Figure 4:
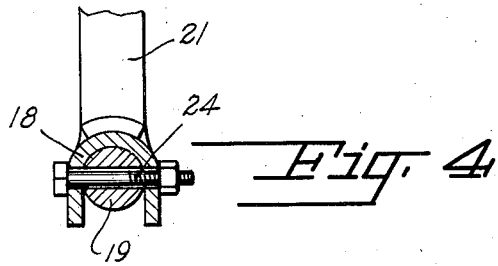
Figure 4 is a detail cross-sectional view taken through the connection of the axles with the supporting frame and showing its bolt securing means adapted to be located in any one of a series of holes in the shaft axle, the view being taken along the line 4—4 of Figure 3, and looking in the direction of the arrows thereof.

Referring now particularly to Figures 1 to 3, 15 represents a draw bar of an implement adapted to be pulled either by animals or by a tractor when connected thereto. On the rear end of this bar is a seat 16 serving as the operator's station for the implement. Extending downwardly from the bottom of the bar and rigidly connected therewith is a transverse axle support 17. This axle support 17 includes a channel portion 18 adapted to receive axles 19 and upstanding brackets 21 secured to the top of the channel portion 18 for connection with the sides of the draw bar by means of a bolt 22. The axle 19 is slidable in and out of the ends of the channel portion 18 and has holes 23 adapted to receive bolts 24 for retaining the axle 19 in any one of its laterally adjusted positions. There are preferably two of these bolts 24 for each axle. By this arrangement the axles can be moved in or out, depending upon the width of the crop rows upon which the implement is to be used.

Ahead of the axle support and secured to the top of the draw bar is a tank support 25 for supporting fuel and compressed air or oxygen tanks 26 and 27. Fuel gas of the tank 26 passes through a mixing chamber 28 through a short pipe connection 29. Compressed air or oxygen is passed from the tank 27 to the mixing chamber 28 through a pipe 31 connected with the top of the tank 27. From this mixing chamber 28 there are extended flexible hose couplings 32 and 33, one toward each axle and respectively extending through the opposite side of the implement for connection with the respective axles. The connection with the axles is effected through a control valve 34 accessible to the operator's station 16. This control valve 34 has a downwardly extending pipe 35 for connection with the axle 19. Also extending from this control valve is a pipe 36 adapted to deliver a flame to the interior of wheel hoods 37 to ignite the burners confined within the box-like structures 38 on the ends of spokes 39 extending radially from a hub portion 41 journaled upon the axle 19. Extending laterally from opposite sides of the draw bar 15 are side members 42 and 43 having elongated slots 44 therein adapted to receive bolt projections 45 on their hoods 37. There are two sets of these laterally extending members 42 and 43, one set ahead of the axle structure 17, and another set in the rear thereof, so as to engage the hood members at their front and rear portions, respectively. These hoods are thereby adjustable laterally outwardly with the axles 19 so as to be centered with the burner boxes 38 as they are moved outwardly by the lateral adjustment of the axles 19. The bolts 45 may be headed over a washer 46 to retain the bolts 45 within the elongated slots 44.

Referring now to Figure 5, there is shown in detail the interior of the hub portions 41 forming a part of the supporting wheels. Within this hub portion 41 is a distributing chamber 47 formed within the axle 19 and receiving the fuel mixture through an axial passage 48 from the control valve pipe 35 threaded into the shaft, as indicated at 49. The shaft 19 has an increased diameter portion 51 containing the distributing chamber 47. This increased diameter portion 51 has a plurality of radially extending holes 52 angularly spaced from one another for distributing the fuel mixture to each of the respective spokes 39 of the supporting wheel structure. The hub portion 41 has chambers 53 at opposite sides of its portion 51 for containing ball bearing units 54. These ball bearing units 54 are fixed to the axle 19 and at opposite sides thereof are appropriate sealing devices 55 retained in flush engagement with the sides of the ball bearing units by compression springs 56. The ball bearing units 54 may be lubricated through a passageway 57 in the hub portion 41.

At the opposite ends of the hub portion 41 there are provided thrust bearing units 58 adapted to be retained upon the shaft 19 by lock nuts 59 engaging with threads upon the axle shaft surface. A plug 61 is inserted into the outer end of the passageway 48 to close the passageway at that end of the axle shaft.

In the outer periphery of the hub portion 41 is an annular groove 62 forming a chamber for receiving the gas mixture from the radially extending passages 52 of the increased diameter portion of the axle 19. Short passages 63 are disposed in the bottom of the groove 62. Laterally spaced sealing elements 64 and 65 are connected between the hub 41 and the large portion 51 of the shaft 19.

Surrounding the hub 41 is a two-part housing 66 into which the spokes 39 are threaded at circumferentially spaced intervals, as indicated at 67. These spokes 39 have a central passageway 68 which communicates with the annular chamber 62. Fuel mixture is received from the chamber 62 and is passed radially outwardly through the spokes 39.

The passageways 68 of the spokes extend to a transverse passageway 71 to which burner units 72 are connected. These burner units 72 are secured by means of a nipple 73 through the sides of the spokes for communication with the transverse passageway 71. These burners 72 have valve control elements 74 and 75 for regulating the fuel mixture contents being passed to the burners. Each of these burners extends into the box structure 38 welded to the ends of the spokes.

These box structures 38 are rounded on their bottoms to assume the shape of a wheel rim. The box structure 38 includes a top plate 76, end plates 77 and 78, and a bottom plate 79 connected by means of bolts 81 to the top plate 76. By removing the bolts 81, the bottom plate 79 can be freed of the box structure 38. The box structure 38 further includes side pieces 82 of arcuate shape and having vent holes 83 therein. The top plate 76, the end plates 77 and the side plates 82 may be interiorly lined with asbestos plates 84, 85, 86 and 87, whereby heat will not be lost through the parts. If desired, the bottom plate 79 can be left off the box structure, as shown in Figure 9. In this instance the flames will be directed upon the bare ground rather than upon the plate 79.

It should now be apparent that there had been provided a device for eradicating cotton and other row crop stubble without great loss of heat from the structure. The heat is confined to that portion of the device which is to directly engage the row crop plants to eradicate them. With the plate 79 upon the box structure, the same will be rolled over the plants so as to impart to the same heat confined within the bottom plate 79. The plant stubble will not only be crushed, but it will be destroyed by the heat. The ground externally of the box-like structure will not be affected by any of the heat therefrom. Bolts 88 extending through the end plates 77 and 78 and the sides 82 will retain the sides and the end pieces in tight fitting engagement with one another.

While various changes may be made in the details of construction, it shall be understood that such changes shall be within the spirit and scope of the present invention as defined by the appended claims.

I claim:

1. A crop destroying agricultural implement comprising a main frame, a transversely extending axle structure on the frame, wheel-supporting devices comprising a hub portion journaled to the axle structure and containing a distributing fuel mixture arrangement, a plurality of circumferentially spaced radially extending spokes connected in fluid communication with the hub portion, heating box structures secured to the outer ends of the spokes, said spokes having passageway means for communicating the fluid to the outer ends of the spokes, and burners extending into the box structures and connected to the passageways of the spokes to receive fuel therefrom, said heating box structures adapted to be heated by the burner means whereby as the implement is drawn over the row crop, the plants will be destroyed from the heat communicated to them from the box structures, and fuel supply means for delivering fluid to the axle structure.

2. A crop destroying agricultural implement comprising a main frame, a transversely extending axle structure on the frame, wheel-supporting devices comprising a hub portion journaled to the axle structure and containing a distributing fuel mixture arrangement, a plurality of circumferentially spaced radially extending spokes connected in fluid communication with the hub portion, heating box structures secured to the outer ends of the spokes, said spokes having passageway means for communicating the fluid to the outer ends of the spokes, burners extending into the box structures and connected to the passageways of the spokes to receive fuel therefrom, said heating box structures adapted to be heated by the burner means whereby as the implement is drawn over the row crop the plants will be destroyed from the heat communicated to them from the box structure, fuel supply means for delivering the fluid to the axle structure, said heating box structures comprising a bottom rounded plate adapted to receive the full force of the flames from the burners within the boxes so that it may be heated to impart to the row crop plants being destroyed, and heat insulating means provided over the interior of the box except for the bottom plate whereby to confine the heat within the box.

3. A crop destroying agricultural implement comprising a main frame, a transversely extending axle structure on the main frame, wheel-supporting devices comprising a hub portion journaled to the axle structure and containing a distributing fuel mixture arrangement, a plurality of circumferentially spaced radially extending spokes connected in fluid communication with the hub portion, heating box structures secured to the outer ends of the spokes, said spokes having passageway means for communicating the fluid to the outer ends of the spokes, burners extending into the box structures and connected to the passageways of the spokes to receive fuel therefrom, said heating box structures adapted to be heated by the burner means whereby as the implement is drawn over the row crop the plants will be destroyed from the heat communicated to them from the box structures, fuel supply means for delivering fluid to the axle structure, said heating box including a bottom plate and a top plate, said bottom plate being removably secured to the top plate whereby at times the bottom plate can be removed and the destroying effect of the box structure be accomplished by the direct impact of the flames upon the crop plants.

4. A crop destroying agricultural implement comprising a main frame, a transversely extending axle structure on the frame, wheel-supporting devices comprising a hub portion journaled to the axle structure and containing a distributing fuel mixture arrangement, a plurality of circumferentially spaced radially extending spokes connected in fluid communication with the hub portion, heating box structures secured to the outer ends of the spokes, said spokes having passageway means for communicating the fluid to the outer ends of the spokes, burners extending into the box structures and connected to the passageways of the spokes to receive fuel therefrom, said heating box structures adapted to be heated by the burner means whereby as the implement is drawn over the row crop, the plants will be destroyed from the heat communicated to them from the box structures, fuel supply means for delivering fluid to the axle structure, and said axles being laterally adjustable to the main support whereby the heating box structures can be adjusted from opposite sides of the implement to alter the implement for operation upon crop rows of different widths.

5. A crop destroying agricultural implement comprising a main frame, a transversely extending axle structure on the frame, wheel-supporting devices comprising a hub portion journaled to the axle structure and containing a distributing fuel mixture arrangement, a plurality of circumferentially spaced radially extending spokes connected in fluid communication with the hub portion, heating box structures secured to the outer ends of the spokes, said spokes having passageway means for communicating the fluid to the outer ends of the spokes, burners extending into the box structures and connected to the passageways of the spokes to receive fuel therefrom, said heating box structures adapted to be heated by the burner means whereby as the implement is drawn over the row crop, the plants will be destroyed from the heat communicated to them from the box structures, fuel supply means for delivering fluid to the axle structure, said axles being laterally adjustable to the main support whereby the heating box structures can be adjusted from opposite sides of the implement to alter the implement for operation upon crop rows of different widths, and hoods extending over the tops of the wheel-like heating box arrangement at the top and sides of the implement, laterally extending members disposed on opposite sides of the frame for supporting the hoods, the connection of the hoods with the laterally extending members being such as to permit the lateral adjustment of the hoods at times when the axles and the bottoms of the box structures are adjusted.

6. A crop destroying agricultural implement comprising a main frame, a transversely extending axle structure on the frame, wheel-supporting devices comprising a hub portion journaled to the axle structure and containing a distributing fuel mixture arrangement, a plurality of circumferentially spaced radially extending spokes connected in fluid communication with the hub portion, heating box structures secured to the outer ends of the spokes, said spokes having passageway means for communicating the fluid to the outer ends of the spokes, burners extending into the box structures and connected to the passageways of the spokes to receive fuel therefrom, said heating box structures adapted to be heated by the burner means whereby as the implement is drawn over the row crop, the plants will be destroyed from the heat communicated to them from the box structures, fuel supply means for delivering fluid to the axle structure, said fuel supply means including a connection with the axles, and a pilot pipe extending from the connection to direct a pilot flame toward the side of the box structure as it passes the pilot flame upon turning about the axle.

7. In an agricultural implement adapted to destroy row crops by the application of heat, an axle structure, means for supplying a fuel mixture to the axle structure, wheel-like arrangements for supporting the axle structure including a hub portion journaled on the axle structure, spokes extending from the hub portion having passageways for the passage of fuel to the outer ends of the spokes, burners located at the outer ends of the spokes and adapted to receive the fuel being passed therethrough for imparting a flame directed toward the row crop being destroyed, said hub portion having an annular chamber on the exterior thereof, said axle structure having a central passageway for communicating the fuel mixture from the fuel supply means axially to the interior of the hub portion, said axle structure having an increased diameter portion lying in the same vertical plane with the annular chamber of the hub portion, radial passageways extending through the increased diameter portion of the axle structure for delivering the fuel mixture radially outwardly for communication with the annular chamber of the hub portion, bearing units located between the interior of the hub portion and the axle structure and laterally spaced from the increased diameter portion of the axle structure, and sealing means disposed on opposite sides of the bearing units and between the bearing units and the increased diameter portion of the axle structure whereby to prevent leakage of the fuel mixture from between the increased diameter portion of the axle structure and the hub portion.

LUTHER B. SWAFFORD.

REFERENCES CITED

The following references are of record in the file of this patent:

UNITED STATES PATENTS

| Number | Name | Date |
|---|---|---|
| 439,176 | Pace | Oct. 28, 1890 |
| 1,088,969 | Cox | Mar. 3, 1914 |